United States Patent
Barton

(10) Patent No.: US 9,684,984 B2
(45) Date of Patent: Jun. 20, 2017

(54) NEARSIGHTED CAMERA OBJECT DETECTION

(71) Applicant: Sage Software, Inc., Irvine, CA (US)

(72) Inventor: Scott E. Barton, Cartersville, GA (US)

(73) Assignee: Sage Software, Inc., Irvine, CA (US)

( * ) Notice: Subject to any disclaimer, the term of this patent is extended or adjusted under 35 U.S.C. 154(b) by 0 days.

(21) Appl. No.: 14/794,328

(22) Filed: Jul. 8, 2015

(65) Prior Publication Data
US 2017/0011275 A1   Jan. 12, 2017

(51) Int. Cl.
| | | |
|---|---|---|
| G06K 9/00 | (2006.01) |
| G06T 11/40 | (2006.01) |
| G06T 7/155 | (2017.01) |
| G06T 7/194 | (2017.01) |
| G06K 9/03 | (2006.01) |
| G06K 9/32 | (2006.01) |
| G06K 9/36 | (2006.01) |
| G06K 9/44 | (2006.01) |
| G06T 7/11 | (2017.01) |

(52) U.S. Cl.
CPC ............... *G06T 11/40* (2013.01); *G06K 9/03* (2013.01); *G06K 9/3258* (2013.01); *G06K 9/36* (2013.01); *G06K 9/44* (2013.01); *G06T 7/11* (2017.01); *G06T 7/155* (2017.01); *G06T 7/194* (2017.01); *G06K 2209/01* (2013.01)

(58) Field of Classification Search
CPC .................................................... G06T 7/194
See application file for complete search history.

(56) References Cited

U.S. PATENT DOCUMENTS

| | | | |
|---|---|---|---|
| 3,967,243 A | | 6/1976 | Kawa |
| 5,640,466 A | * | 6/1997 | Huttenlocher ........... G06K 9/00 382/177 |
| 5,740,330 A | * | 4/1998 | Abe .................... G06K 15/1209 358/1.2 |

(Continued)

OTHER PUBLICATIONS

Wikipedia. "Canny Edge Detector." Retrieved from "https://en.wikipedia.org/w/index.php?title=Canny_edge_detector&oldid=702997772" on Feb. 9, 2016. 9 pages.

(Continued)

*Primary Examiner* — Oneal R Mistry
(74) *Attorney, Agent, or Firm* — Meunier Carlin & Curfman LLC

(57) ABSTRACT

A system and process of nearsighted (myopia) camera object detection involves detecting the objects through edge detection and outlining or thickening them with a heavy border. Thickening may include making the object bold in the case of text characters. The bold characters are then much more apparent and heavier weighted than the background. Thresholding operations are then applied (usually multiple times) to the grayscale image to remove all but the darkest foreground objects in the background resulting in a nearsighted (myopic) image. Additional processes may be applied to the nearsighted image, such as morphological closing, contour tracing and bounding of the objects or characters. The bound objects or characters can then be averaged to provide repositioning feedback for the camera user. Processed images can then be captured and subjected to OCR to extract relevant information from the image.

47 Claims, 12 Drawing Sheets

(56) References Cited

U.S. PATENT DOCUMENTS

| | | |
|---|---|---|
| 6,671,395 B1 | 12/2003 | Ott et al. |
| 7,043,080 B1 | 5/2006 | Dolan et al. |
| 8,320,708 B2 | 11/2012 | Kurzweil et al. |
| 8,837,833 B1* | 9/2014 | Wang ................. G06K 9/00469 |
| | | 382/182 |
| 9,262,689 B1* | 2/2016 | Sikka ....................... G06K 9/34 |
| 2003/0142865 A1 | 7/2003 | Hirota et al. |
| 2003/0185448 A1* | 10/2003 | Seeger ................. G06K 9/2054 |
| | | 382/229 |
| 2004/0022451 A1* | 2/2004 | Fujimoto .............. G06T 3/0031 |
| | | 382/275 |
| 2007/0127815 A1 | 6/2007 | Karidi et al. |
| 2007/0217701 A1* | 9/2007 | Liu ........................... G06K 9/38 |
| | | 382/234 |
| 2008/0049107 A1* | 2/2008 | Hii .......................... G06T 11/60 |
| | | 348/207.1 |
| 2009/0060330 A1* | 3/2009 | Liu ......................... G06K 9/342 |
| | | 382/173 |
| 2009/0274369 A1* | 11/2009 | Sano ...................... G06K 9/033 |
| | | 382/182 |
| 2011/0007970 A1* | 1/2011 | Saund ................ G06K 9/00449 |
| | | 382/176 |
| 2011/0249897 A1* | 10/2011 | Chaki ...................... G06K 9/34 |
| | | 382/177 |
| 2013/0242054 A1* | 9/2013 | Chiu ....................... G06T 17/00 |
| | | 348/46 |
| 2013/0335424 A1 | 12/2013 | Wang et al. |
| 2014/0218493 A1 | 8/2014 | Dialameh et al. |
| 2014/0270528 A1 | 9/2014 | Ramos et al. |
| 2015/0049948 A1 | 2/2015 | Bala |
| 2015/0248775 A1* | 9/2015 | Freeman ............... G06T 7/0081 |
| | | 345/589 |
| 2016/0300116 A1* | 10/2016 | Yasunaga ............... G06K 9/325 |

OTHER PUBLICATIONS

Wikipedia. "Otsu's Method." Retrieved from "https://en.wikipedia.org/w/index.php?title=Otsu%27_method&oldid=704009845" on Feb. 9, 2016. 7 pages.

Wikipedia. "Sobel Operator." Retrieved from "https://en.wikipedia.org/w/index.php?title=Sobel_operator&oldid=700766553" on Feb. 9, 2016. 7 pages.

International Search Report and Written Opinion dated Oct. 4, 2016, issued in International Application No. PCT/US2016/41547.

International Search Report and Written Opinion dated Oct. 6, 2016, issued in International Application No. PCT/US2016/041552.

Office Action issued in U.S. Appl. No. 14/794,407, dated Oct. 20, 2016.

Notice of Allowance issued in U.S. Appl. No. 14/794,407, dated Feb. 24, 2017.

* cited by examiner

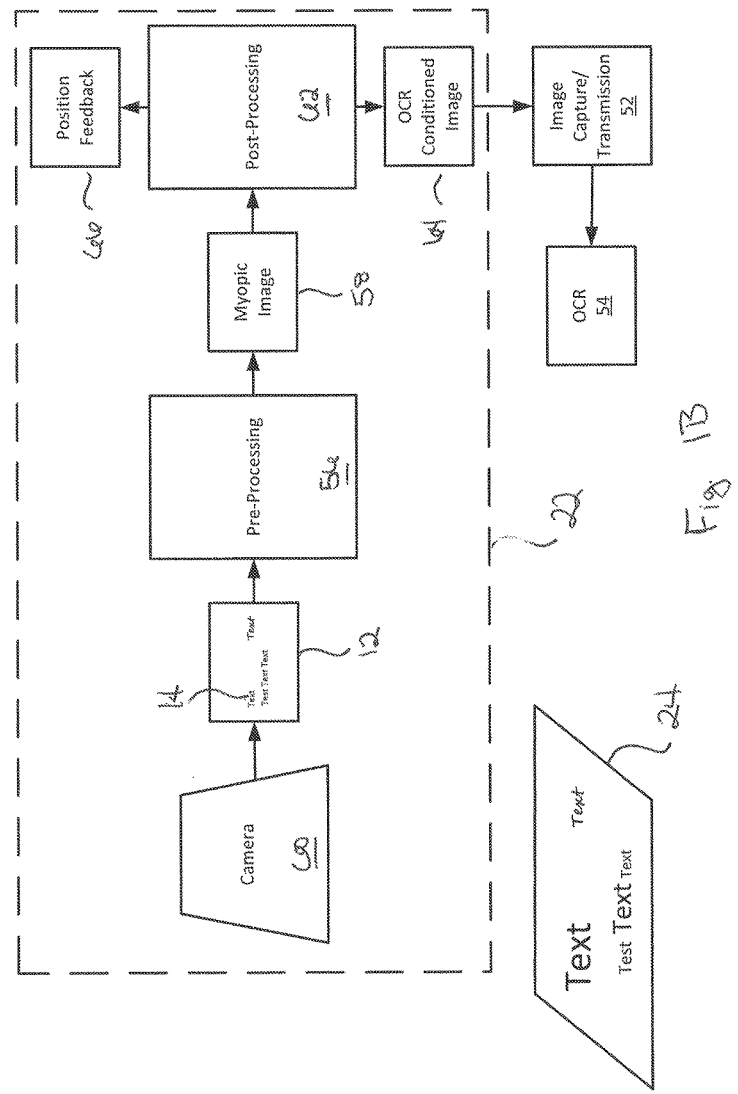

| -1 | 0 | +1 |
|---|---|---|
| -2 | 0 | +2 |
| -1 | 0 | +1 |

Gx

| +1 | +2 | +1 |
|---|---|---|
| 0 | 0 | 0 |
| -1 | -2 | -1 |

Gy

FIG. 7
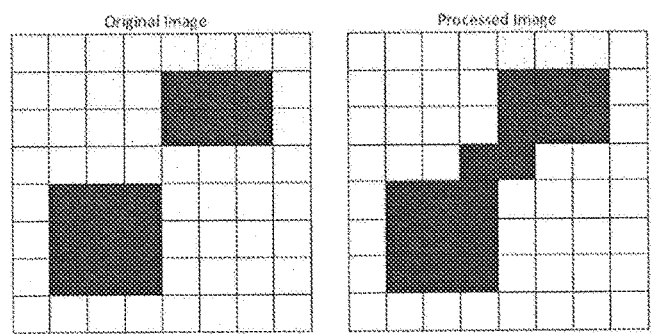
FIG. 8
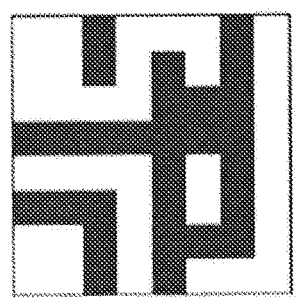
FIG. 9
FIG. 10

| 1 | 1 | 0 | 1 | 1 | 1 | 0 | 1 |
|---|---|---|---|---|---|---|---|
| 1 | 1 | 0 | 1 | 0 | 1 | 0 | 1 |
| 1 | 1 | 1 | 1 | 0 | 0 | 0 | 1 |
| 0 | 0 | 0 | 0 | 0 | 0 | 0 | 1 |
| 1 | 1 | 1 | 1 | 0 | 1 | 0 | 1 |
| 0 | 0 | 0 | 1 | 0 | 1 | 0 | 1 |
| 1 | 1 | 0 | 1 | 0 | 0 | 0 | 1 |
| 1 | 1 | 0 | 1 | 0 | 1 | 1 | 1 |

FIG. 11

NEARSIGHTED CAMERA OBJECT DETECTION

FIELD OF THE INVENTION

The present invention is related to optical character recognition and in particular the production of images to improve the accuracy of optical character recognition.

BACKGROUND OF THE INVENTION

Consumers have flocked to mobile devices for a range of applications. Popular applications include budgeting and banking applications. To use these applications, a consumer will, for example, take a photo of a paper document that is a receipt or a check. The mobile device then performs some type of optical character recognition on the document, turning the raw image into alphanumeric character data for storage.

Despite some success, consumers are often frustrated by the inaccuracy of the optical character recognition (OCR) process. There are at least several reasons for these inaccuracies. Unlike large, fixed scanners, handheld electronic devices struggle to capture good images for OCR processing. For example, handheld mobile (and other electronic) devices are prone to unsteady and imperfect photographing of the document. In addition, lighting and backgrounds can vary introducing artefacts and/or affecting the amount of contrast in the image. A handheld device can also suffer from skew introduced by not having the camera's focal plane square with the document itself.

Other challenges are introduced by the documents themselves. Documents have differing characteristics, such as varying fonts, and the OCR process can fail to interpret various stylistic font differences. Varied documents also have varied sizes—leading many banking applications to focus just on checks having a predictable size.

Current applications focus on a mixture of guiding the consumer to take better images and image processing in an attempt to improve accuracy. For example, some banking applications provide the consumer a frame in which to position the check to avoid skew and improve the resolution of the check image. These applications may also reject a check that is insufficiently clear. Conventional image processing can include binarization to remove background artefacts. Despite these improvements, attempts at gathering images of documents for processing and the OCR processing itself, especially with handheld electronic devices, still fail often enough to frustrate consumers. It is therefore desirable to improve the accuracy and efficiency of image capture and OCR processing of documents, especially documents captured using handheld electronic devices.

SUMMARY OF THE INVENTION

Implementations of the present invention include a system and method for generating a "myopic" image that attenuates or eliminates background information and further processing the myopic image to create an OCR conditioned image that improves the likelihood of successful OCR processing. Generally, the method may include pre-processing by obtaining a source image of a foreground document containing characters, detecting edges of the characters, thickening edges of the characters and thresholding the source image to produce a myopic image. Generally, the source image is acquired using a camera of a handheld electronic device. Further comprising the method may be post-processing activities to produce an OCR conditioned image.

The inventors have also produced an OCR conditioned image having improved OCR accuracy over conventional processes using these images in ranges of as much as 5% to 100% depending on environmental conditions such as light levels, paper and foreground\background color contrast. Post-processing images performed on the myopic image can include adaptive thresholding, morphological closing, contour tracing and calculating an average object size. In one aspect, if the average object size is not within a predetermined range, position feedback can be provided to a user alerting the user to reposition the camera. Once an image is obtained having at least an average object size within the predetermined range, the improved OCR conditioned image can be transmitted or otherwise provided to an OCR processing system.

In one implementation, a method is provided for generating an image for OCR. The method includes obtaining a source image containing characters. Edges of the characters are detected and thickened. And, the source image is thresholded.

Detecting edges of the characters may include estimating a gradient of characters of the source image. Thickening edges of the characters may include determining an absolute gradient magnitude at points within the source image. For example, the edges may be detected and thickened using a 3×3 pixel or larger mask. The mask may be smaller than the average size of the characters. Varied masks may be employed, such as a convolution masks.

Estimating the gradient of the characters may be done in a first direction and a second direction. For example, an x-direction and a y-direction.

Thickening of the edges of the characters may be performed with a Sobel operator. The Sobel operator may use at least one convolution mask, such as a pair of convolution masks. The convolution masks may be smaller than the characters. The convolution masks may be 3×3 pixels, for example. Use of the Sobel operator may include sliding the convolution mask over the source image.

Thickening the edges may include calculating a magnitude of a gradient of the detected edges of the characters. Thickening the edges may also include estimating the gradient of the detected edges using a mask.

Thresholding may include using an assumption of a foreground and background in the source image. For example, thresholding may include determining an optimal threshold value. Determining the optimal threshold value may include minimizing within class variance of the foreground and background. Minimizing within class variance may also include weighting of the foreground and background.

Thresholding may also include removing grayscale from a background of the source image. And, thresholding may include using histogram segmentation. Thresholding may also include using Otsu global thresholding with a block size smaller than an average size of the characters.

Thresholding may be repeated until a nearsighted image is generated. Also characters may be repaired by morphologically closing them after thresholding. Morphologically closing may include use of a structuring element. The structuring element may be a line-shaped structuring element to fill gaps within the characters.

The method may also include determining a contour of the characters, such as be determining contour points. Determining the contour may also include determining a contour hierarchy. Determining the country may also include using a Suzuki and Abe algorithm. Contours with less than three contour points may be dropped. Contours points may be approximated as polygonal curves. Also, approximating the contour points may include reducing the contour to a simple closed polygon.

The method may also include bonding the contour. Bounding may, for example, include circumscribing the contour with a rectangle. Circumscribing may include determining a minimal upright bounding rectangle for the contour. A plurality of contours may be used to approximate rows of characters.

The method may further include determining an average height of the rows of characters. Also, the method may include determining an average font height for the characters based on the average height of rows of the characters. Also, the method may include performing OCR using the average font height.

In another implementation, obtaining the source image containing characters comprises continuously acquiring the source image and dynamically detecting the edges of the characters, thickening the edges of the characters, and thresholding the source image while the source image is being continuously acquired. Continuously acquiring the source image may be performed, for example, by a handheld electronic device. The handheld electronic device may further include a display. An image displayed by the handheld electronic device may include the image for optical character recognition.

Implementations of the present invention provide many advantages. Measurement of the distance of the lens from the paper facilitates capture of a font object size for improved clarity. The improved clarity results in improved OCR recognition rates as compared to freehand capture of the image. Implementations also provide an ability to calculate optimal font size for OCR detection on a live video feed while accounting for optimal focus and clarity. Implementations of the present invention can measure and record optimal focal length and OCR font size ranges on raw video feed. These measurements can be used to guide the camera user through visual cues and indicators to move the camera to the best location in space. This produces a better OCR compatible image for text recognition. The focal ratio determines how much light is picked up by the CCD chip in a given amount of time. The number of pixels in the CCD chip will determine the size of a font text character matrix. More pixels means a bigger font size, regardless of the physical size of the pixels. OCR engines have an expected and optimal size range for character comparison. When fonts are in the optimal range and have clear crisp well defined edges, OCR detection and accuracy is improved. Implementations of the present invention provide guidance to that optimal range.

These and other features and advantages of the present invention will become more readily apparent to those skilled in the art upon consideration of the following detailed description and accompanying drawings, which describe both the preferred and alternative embodiments of the present invention.

BRIEF DESCRIPTION OF THE DRAWINGS

FIGS. 1A and 1B illustrate an exemplary method and overview system for generating a "myopic" image that attenuates or eliminates background information and further processing the myopic image to create an OCR conditioned image that improves the likelihood of successful OCR processing;

FIG. 7 illustrates the use of morphological closing process using a structural element to repair gaps in characters;

FIG. 8 shows an exemplary line-shape structuring element for morphological closing;

FIG. 9 shows exemplary before (left) and after (right) images for morphological closing;

FIGS. 10 and 11, respectively, show an exemplary black-and-white image and its connected component matrix that can be used in a contour tracing process, which uses the size of each element or pixel to measure the height and width of the sequence;

DETAILED DESCRIPTION OF THE INVENTION

Figure 1A:
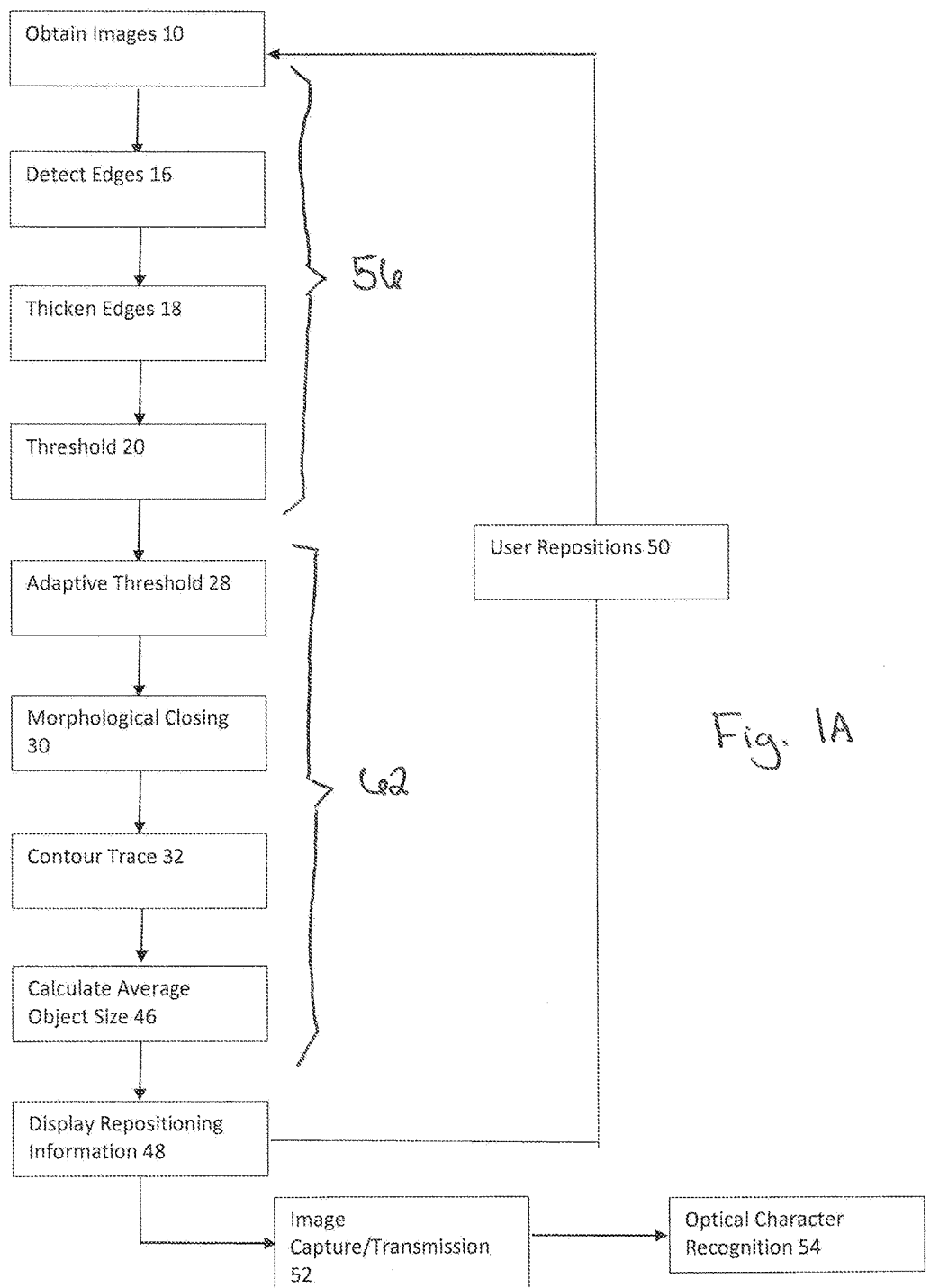

The present invention now will be described more fully hereinafter with reference to specific embodiments of the invention. Indeed, the invention can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise. The term "comprising" and variations thereof as used herein is used synonymously with the term "including" and variations thereof and are open, non-limiting terms.

"Exemplary" means "an example of" and is not intended to convey an indication of a preferred or ideal embodiment. "Such as" is not used in a restrictive sense, but for explanatory purposes.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a handheld electronic device, a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Implementations of the present invention include a system and method for generating a "myopic" image that attenuates or eliminates background information and further processing the myopic image to create an OCR conditioned image that improves the likelihood of successful OCR processing. Generally, as shown in FIGS. 1A and 1B, the method may include pre-processing 56 by obtaining 10 a source image 12 of a foreground document 24 containing characters 14, detecting 16 edges of the characters 14, thickening 18 edges of the characters 14 and thresholding 20 the source image 12 to produce a myopic image 58. Generally, the source image 12 is acquired using a camera 60 of a handheld electronic device 22. Further comprising the method illustrated in FIG. 1A are post-processing activities 62 to produce an OCR conditioned image 64. The inventors have produced an OCR conditioned image 64 having improved OCR accuracy over conventional processes using these images in ranges of as much as 5% to 100% depending on environmental conditions such as light levels, paper and foreground\background color contrast. Post-processing images performed on the myopic image 58 can include adaptive thresholding 28, morphological closing 30, contour tracing 32 and calculating an average object size 46. In one aspect, if the average object size is not within a predetermined range, position feedback 66 can be provided to a user alerting the user to reposition the camera 60. Once an image is obtained having at least an average object size within the predetermined range, the improved OCR conditioned image 64 can be transmitted 52 or otherwise provided to an OCR processing system 54.

Figures 2, 3:
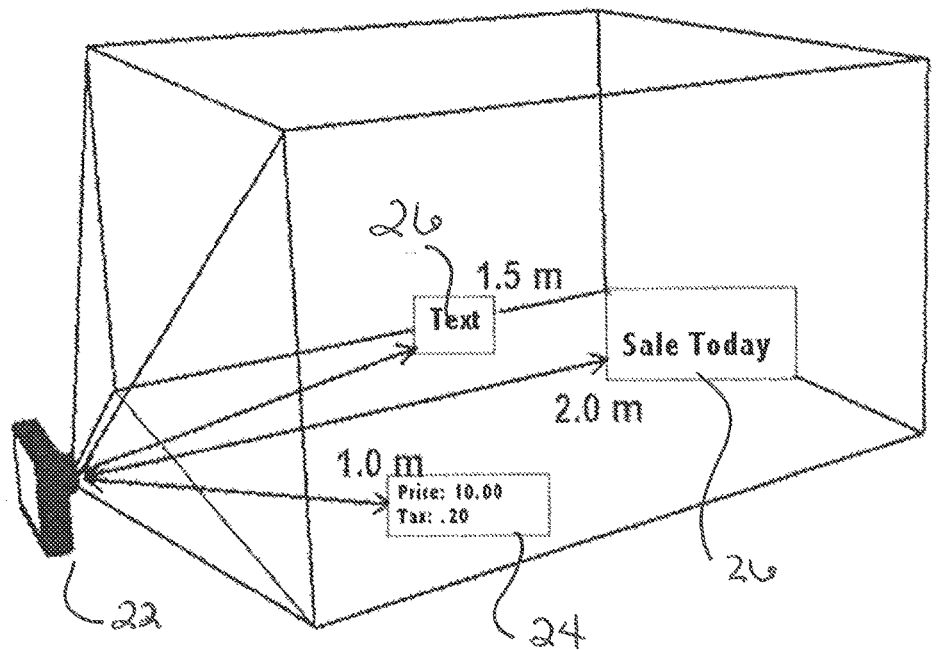
FIG. 2 is an illustration showing a handheld electronic device having a camera with a focal region and a particular defined focal length.
FIG. 3 illustrates and exemplary pair of convolution masks comprising 3×3 pixel rectangles that can be used by a Sobel edge detector.

As shown in FIG. 2, a handheld electronic device 22 has a camera with a focal region (within the box) and a particular defined focal length. Various documents or other objects or images 24 within the focal region may be picked up within an image generated by the electronic device 22. For example, the consumer may hold up a foreground document 24 (such as a receipt) and behind it may be various background objects or documents 26—such as a signs within a restaurant generating the receipt. An issue with the background documents 26 is that they might get captured in the OCR process and/or may interfere with the OCR of characters 14 on the foreground document 24.

Some aspects of the present invention address this issue by providing (in a simplified description not necessarily capturing all possible permutations or complexities) a process for "nearsighted" or "myopic" capture of information that helps to exclude background objects. The nearsighted capture effectively blurs, attenuates and/or eliminates artefacts or other characters that are further away than the document of interest—thus improving the accuracy of the OCR process.

Generally, the process of nearsighted (myopia) camera object detection involves detecting 16 the objects through edge detection and outlining or thickening 18 them with a heavy border. (Thickening may include making the object bold in the case of text characters.) The bold characters are then much more apparent and heavier weighted than the background—which tends to be grayscale or at least blurred being outside preferred focal lengths. Thresholding 20 operations are then applied (optionally, multiple times) to the grayscale image to remove all but the darkest foreground objects in the background resulting in a nearsighted (myopia) image.

Other aspects of systems and methods also facilitate improved image capture by providing feedback 66 to the consumer on the positioning 50 of the foreground document 24 within an acceptable focal length of the hand held electronic device 22. Generally, the system and method facilitate positioning continuously processing captured images, determining average character sizes of the indicia on those images and comparing them to expected font sizes. The handheld electronic device 22 then provides feedback 66 that can include visual cues (such as a slider bar and green or red status colors) on a display to guide the consumer in repositioning the camera relative to the document 24, haptic feedback, audible feedback, or combinations thereof.

As shown in FIGS. 1A and 1B, the handheld electronic device 22 obtains 10 one or more source images 12. The source images may be generated by a camera 60 attached to, part of or integrated into the handheld electronic device 22. Or, the source images 12 may already be in a memory of the handheld electronic device 22. Or, the source images 12 may be received from some other camera or image capture device or from storage associated with such a device. (And combinations of the aforementioned sources may provide the source images 12.)

Despite the availability of other options, most implementations of the present invention are well suited for mobile electronic devices 22 including a camera 60 and generating source images 12 in the present. For example, the handheld electronic device 22 may be a phone with a camera capturing video (and multiple source images per second) of the foreground document 24.

As shown in FIGS. 1A and 1B, 3 and 4, the process includes detecting 16 edges of the source image 12. For example, a Sobel edge detection application or process may be employed for a 2-D spatial gradient measurement on the image. Sobel operators are discrete differentiation operators. Generally, the Sobel edge detection application may approximate an absolute gradient magnitude at each point in a grayscale source image 12. The Sobel edge detection algorithm may be configured with a relatively small window size—such as a window smaller than the expected pixel size of the objects or characters to be processed. For example, the Sobel edge detector has a pair of convolution masks that may be, as shown in FIG. 3, 3×3 pixel rectangles. One of the convolution masks estimates the gradient in the x-direction (Gx or columns) and the other estimates the gradient in the y-direction (Gy or rows). The Sobel operator slides the mask over the source image one pixel at a time—thus it manipulates one square of pixels at a time.

The convolution masks are represented by the following equations and/or pseudo-code:

```
int    GX[3][3];
int    GY[3][3];
/* 3x3 GX Sobel mask */
GX[0][0] = -1; GX[0][1] = 0; GX[0][2] = 1;
GX[1][0] = -2; GX[1][1] = 0; GX[1][2] = 2;
GX[2][0] = -1; GX[2][1] = 0; GX[2][2] = 1;
/* 3x3 GY Sobel mask */
GY[0][0] = 1; GY[0][1] = 2; GY[0][2] = 1;
GY[1][0] = 0; GY[1][1] = 0; GY[1][2] = 0;
GY[2][0] = -1; GY[2][1] = -2; GY[2][2] = -1;
```

The Sobel operator also calculates the magnitude of the gradient:

$$|G| = \sqrt{Gx^2 + Gy^2}$$

Additional pseudo-code illustrates movement of the mask across the image, gradient approximation and other operations in full context.

```
sImage     originalImage; // Input Image
sImage     edgeImage;
--------------------------------------------------*/
for(Y=0; Y<=(originalImage.rows-1); Y++) {
    for(X=0; X<=(originalImage.cols-1); X++) {
        long sumX = 0;
        long sumY = 0;
        /*-------X GRADIENT APPROXIMATION------*/
        for(I=-1; I<=1; I++) {
            for(J=-1; J<=1; J++) {
                sumX = sumX + (int)( (*(originalImage.data + X + I +
                (Y + J)*originalImage.cols)) * GX[I+1][J+1]);
            }
        }
        /*-------Y GRADIENT APPROXIMATION-------*/
        for(I=-1; I<=1; I++) {
            for(J=-1; J<=1; J++) {
                sumY = sumY + (int)( (*(originalImage.data + X + I +
                (Y + J)*originalImage.cols)) * GY[I+1][J+1]);
            }
        }
        /*---GRADIENT MAGNITUDE APPROXIMATION (Myler
        p.218)----*/
            SUM = abs(sumX) + abs(sumY);
if(SUM>255) SUM=255;
    if(SUM<0) SUM=0;
    *(edgeImage.data + X + Y*originalImage.cols) = 255 - (unsigned
    char)(SUM);
    }
}
```

Figure 4:
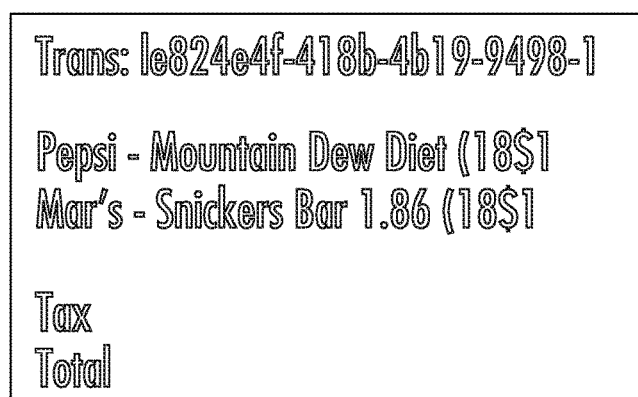
FIG. 4 is an image of the source image after edge detection has been performed on the characters of the source image.

Generally, then, the Sobel operator changes a pixel's value to the value of the mask output. Then it shifts one pixel to the right, calculates again, and continues to the right until it reaches the end of a row. The Sobel operator then starts at the beginning of the next row. As shown in FIG. 4 the Sobel operator hollows out the internal pixels of the characters and thickens the edges—generally providing a highlighting effect. Restated, the edge detection highlights the foreground object or text characters to make them bold and have a heavy weight in the grayscale image. Notably, Sobel operators are not the only processes that can detect and thicken edges—but the inventors have found the Sobel operator and particular mask size to be well-suited for receipts.

Another implementation of the Sobel operator uses the following kernel for noise reduction:

$$x = \begin{bmatrix} -3 & 0 & +3 \\ -10 & 0 & +10 \\ -3 & 0 & +3 \end{bmatrix} \quad y = \begin{bmatrix} -3 & -10 & -3 \\ 0 & 0 & 0 \\ +3 & +10 & +3 \end{bmatrix}$$

The kernal window is moved over the image with no scale or shift in delta. This kernal, for example, can be employed with the following variables submitted to the Sobel operator:

Sobel(in=inputImage, out=outputImage, GrayScale, $x_{order}=1$ and $y_{order}=0$ KernelSize=3, scale=1, delta shift=0, DrawSolidBorderOnEdge=IntensitySurounding WindowPixelsMax)

wherein:

| | |
|---|---|
| Rectangle rects[ ] | //- Rectangle Array |
| Image inputImage | //- Pumped in Video Frame |
| Image outputImage | //- Output Image after standard operations |
| Image outputImage2 | //- Output Image after optional operations. |

Kernel selection and size can be adjusted for different foreground object types, such as checks, receipts, business cards, etc. The inventors, however, determined the disclosed particular order of steps and kernel selection to be particularly effective.

As shown in FIGS. 1A and 1B, the method includes thresholding 20 of the source image 12. For example, an Otsu thresholding may be applied. The Otsu thresholding makes an automatic binarization level decision based on histogram shape. Although other binarizing and/or thresholding routines may be applied, the Otsu thresholding has an algorithm that assumes the source image 12 is composed of two basic classes. These two basic classes, foreground and background, work well with the Sobel operator for myopic image generation.

Figure 5:
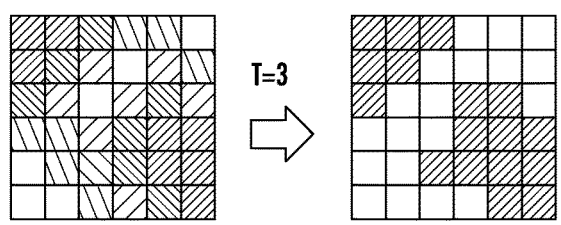
FIG. 5 shows a sample pixel set from an image before (on the left) and after (on the right) Otsu thresholding is applied.

FIG. 5 shows a sample pixel set from an image before (on the left) and after (on the right) Otsu thresholding is applied. During application, Otsu thresholding computes an optimal threshold value that minimizes the within class variance for the background and foreground classes. Minimizing the within class variance has the same effect as maximizing the between class variance. Thus, as shown in FIG. 5, the image on the right fills foreground pixels and nulls background pixels into a binary image. The following is a simple example of the calculation in code:

| Background | | Foreground | |
|---|---|---|---|
| Weight | $W_b$ | Weight | $W_f$ |
| Mean | $\mu_b$ | Mean | $\mu_f$ |
| Variance | $\sigma_b^2$ | Variance | $\sigma_f^2$ |

$$\text{Within Class Variance } \sigma_W^2 = W_b \sigma_b^2 + W_f \sigma_f^2$$

$$\begin{aligned}\text{Between Class Variance } \sigma_B^2 &= \sigma^2 + \sigma_W^2 \\ &= W_b(\mu_b - \mu)^2 + W_f(\mu_f - \mu)^2 \\ &\text{(where } \mu = W_b\mu_b + W_f\mu_f\text{)} \\ &= W_b W_f (\mu_b - \mu_f)^2 \end{aligned}$$

Pseudocode of the Otsu thresholding is shown below:

```
// Calculate histogram
int ptr = 0;
while (ptr < srcData.length) {
  int h = 0xFF & srcData[ptr];
  histData[h] ++;
  ptr ++;
}
// Total number of pixels
int total = srcData.length;
float sum = 0;
for (int t=0 ; t<256 ; t++) sum += t * histData[t];
float sumB = 0;
int wB = 0;
int wF = 0;
float varMax = 0;
threshold = 0;
for (int t=0 ; t<256 ; t++) {
  wB += histData[t];          // Weight Background
  if (wB == 0) continue;
  wF = total - wB;            // Weight Foreground
  if (wF == 0) break;
  sumB += (float) (t * histData[t]);
  float mB = sumB / wB;        // Mean Background
  float mF = (sum - sumB) / wF; // Mean Foreground
  // Calculate Between Class Variance
  float varBetween = (float)wB * (float)wF * (mB - mF) * (mB - mF);
  // Check if new maximum found
  if (varBetween > varMax) {
    varMax = varBetween;
    threshold = t;
  }
}
```

The range of the histogram is −1 to 255 in grayscale intensity. Variables may be sent to the Otsu operator to set the histogram range:
Otsu_Threshold(in=outputImage, out=outputImage, Histogram_From=−1

Histogram_To=255, BlackForegroundWhiteBackground).

Thresholding may also additionally or alternatively include an adaptive thresholding 28 for strong edge segmentation. Adaptive thresholding using a small block size can result in erosion and highlighting of only the strongest edges. Adaptive thresholding beneficially can dynamically remove noise for the nearsighted camera operation. Adding the second (or additional) thresholding process segments the images—separating weak edges from strong edges.

For example, the destination pixel (dst) is calculated as the mask window is passed over the image:

$$dst(x, y) = \begin{cases} 0 & \text{if } src(x, y) > T(x, y) \\ \text{maxValue} & \text{otherwise} \end{cases}$$

where T(x, y) is a threshold calculated individually for each pixel.

The threshold value T(x, y) is a mean of the blockSize× blockSize neighborhood of (x, y) minus C.

With a small neighborhood, adaptive thresholding functions like adaptive edge detection—highlighting only the strongest edges.

Figure 6:
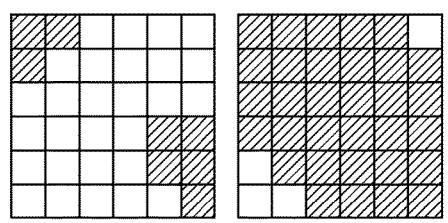
FIG. 6 illustrate before and after images of adaptive thresholding.

Generally, the adaptive thresholding 28 divides the image into a number of equal blocks. It calculates the threshold value inside each of the blocks. Then the mean value of all the blocks is calculated. Mean values below a threshold result in removal of blocks (left hand side of FIG. 6) while the values above the threshold result in fill (right hand side of FIG. 6). Symbolically, the variance is defined:

$$\sigma^2 = \frac{1}{n}\sum_{1}^{n-1}(Ti - \mu)^2$$

wherein Ti is the threshold value of each block, μ is the mean of all blocks, n is the number of blocks.

Thus, as the block window is passed over the image, pixels are filled with black or removed with a fill of white depending on the concentrations in the block of primary black or white. The adaptive thresholding then can be a form of thinning operation leaving only the strongest edges which generally should be foreground objects—such as characters 14 on the foreground object 24.

In one implementation, adaptive thresholding (or erosion) 28 is by way of a 7×7 pixel kernel. The thresholding uses the mean of the kernel pixels to determine black or white for the kernel window moving over the image after global segmentation by the Otsu operation. Thus, squares of 7×7 pixels are forced into black or white, such as is shown in the following variable selection for an adaptive threshold application:
BlockSize=7
int Thresh_Kernel[BlockSize][BlockSize]
AdaptiveThresholdErosion(in=outputImage,
    out=outputImage2,
    Histogram_From=−1       Histogram_To=255,
    Kernel=Thresh_Kernel,
    BlackBackgroundWhiteForeground_Inverse).

Generally, then, this thresholding operation completes washing out of the background to generate a nearsighted or myopic image.

Another thresholding operation may make a second, third or otherwise additional (or only) pass over the image. This operation may be optional based on the mean light level in the histogram. Additional thresholding can be skipped if the image is light already based on the mean light level in the histogram. This is demonstrated by pseudocode below:
  BOOL TreatWithSecondPassErosionImage
The mean and standard deviation of the grayscale image are determined:
  var Mean
  var Stddev
  get_meanStdDev(in=inputImage, out=Mean, out=Stddev)
The low extreme of the mean is set to determine whether to employ additional thresholding:

```
if( cvMean.val[0] < 120 && cvStddev.val[0] > 40 ) // Dark
{
   TreatWithSecondPassErosionImage = TRUE
}
else if( cvMean.val[0] >= 120 && cvMean.val[0] < 200 &&
cvStddev.val[0] < 40 ) // Medium
{
   TreatWithSecondPassErosionImage = TRUE
}
else if( cvMean.val[0] >= 200 && cvStddev.val[0] < 40 ) // Light
{
   TreatWithSecondPassErosionImage = FALSE
}
else // Anything else
{
   TreatWithSecondPassErosionImage = TRUE
}
// Use one or the other of the images
if(TreatWithSecondPassErosionImage == TRUE)
{
   outputImage = outputImage2
}
```

In any case, the resulting myopic image is then ready for the next phase of OCR processes and/or can be used to facilitate adjustment of the relative positioning of the object and mobile electronic device 22. Generally, computer vision algorithms are applied to the resulting image for improved accuracy in object size detection. The method may for example include morphological closing 30, contour tracing 32 and bounding 34 of the objects or characters 14, as shown in FIGS. 1A and 1B.

The morphological closing 30 process uses a structural element to repair gaps in characters, as shown in FIG. 7. The nearsighted operation washes out the background and can damage foreground objects. The morphological closing 30 process repairs and closes the lines in the foreground objects based on a line-shaped structuring element. The line-shaped structuring element fills the font or text character objects—repairing the damage. FIG. 8 shows the line-shape structuring element and FIG. 9 shows the before (left) and after (right) images for morphological closing.

Figure 18:
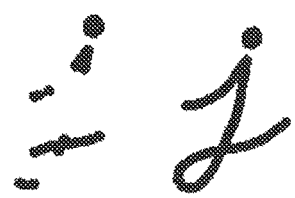
FIG. 18 shows an exemplary structuring element comprising a 20×3 line segment used to repair a cursive "j" character in a morphological closing process.

An exemplary structuring element is a 20×3 line segment and used to repair a cursive "j" character, as shown in FIG. 18.

The contour tracing 32 process gathers objects and sizes. These objects and sizes are used to determine the average text object size on the foreground document 24. The contour tracing 32 process includes detection of edges that yield contours of the underlying object. Generally, the objects with contours will be closed objects. The matrix of a particular image includes trees or lists of elements that are sequences. Every entry into the sequence encodes information about the location of the next point of the object or character.

FIGS. 10 and 11, respectively, show an exemplary black-and-white image and its connected component matrix. The contour tracing 32 process uses the size of each element or pixel to measure the height and width of the sequence. As a result, the contour tracing 32 process has determined how many characters or objects are in the nearsighted image and the size of each object or character.

Figure 12:
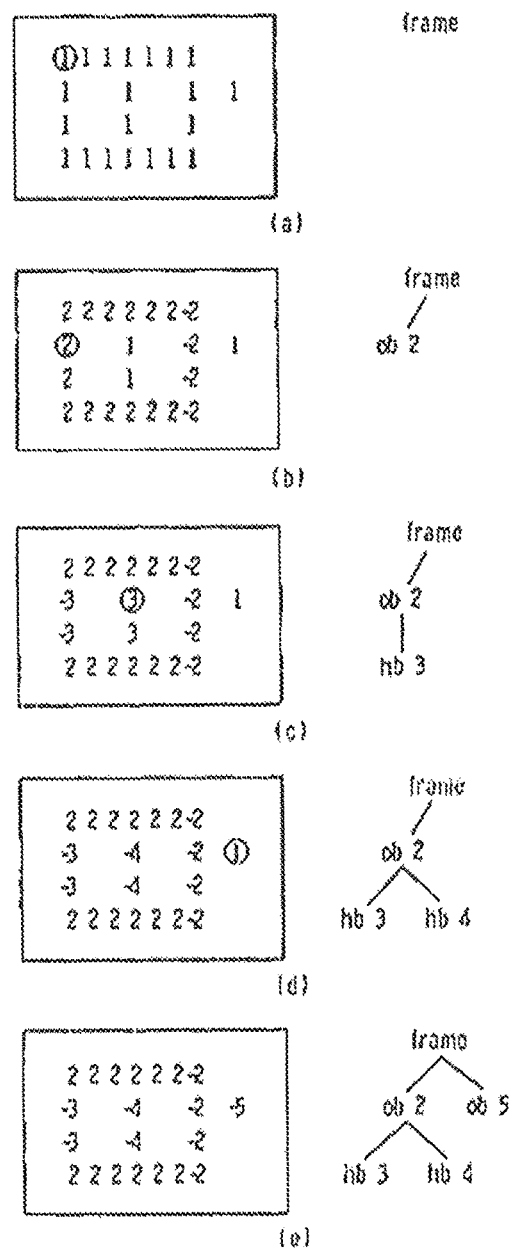
FIG. 12 shows an example of the Suzuki and Abe process building the sequence (in the form of a tree of elements) from an image.
Figure 13:
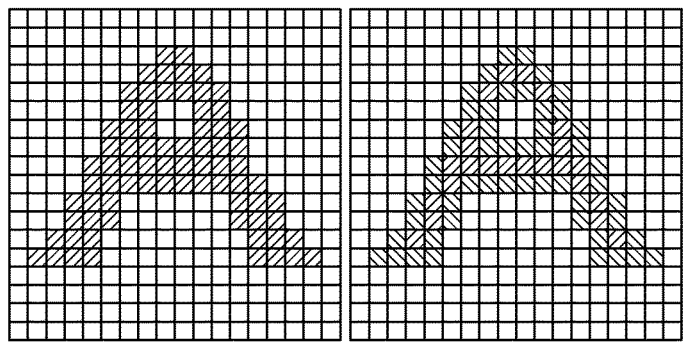
FIG. 13 shows before (left) and after (right) images where the algorithm traced the contours of an "A" character.

An exemplary process for contour tracing 32 includes using the Suzuki and Abe algorithm. Generally, the algorithm determines topographical information about contours of objects using hierarchical border following. FIG. 12 shows an example of the Suzuki and Abe process building the sequence (in the form of a tree of elements) from an image. FIG. 13 shows before (left) and after (right) images where the algorithm traced the contours of an "A" character. As an additional step, contour tracing 32 includes elimination of contours with less than three contour points or not enough points to form a character or desired object.

Contour tracing 32 also can include a shape approximation process. Assuming that most contour points form polygonal curves with multiple vertices, the shape can be approximated with a less complex polygon. The shape approximation process may include, for example, the Ramer-Douglas-Peucker (RDP) algorithm. The RDP algorithm finds similar curves with fewer points with a dissimilarity less than or equal to a specific approximation accuracy. The shape approximation process facilitates bounding 34 by reducing the contours of the characters to simple polygon closed shapes.

In one implementation, the following variables are submitted to the Suzuki and Abe application:

```
Objects objects[ ]       //- array of objects
Objects objects2[ ]      //- array of objects meeting filtered size and
                           component
FindObjects( in = outputImage, out = objects, FindOutsideOnlyContour)
```

Notably, this submission is only concerned with the outside shape of the objects to allow them to be bound within another shape, such as a box which represents the minimum and maximum x and y pixel coordinates of the object.

Figure 14:
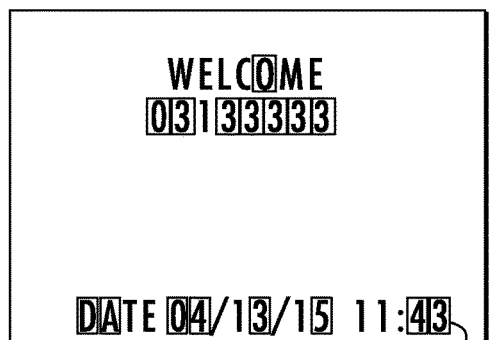
FIGS. 14 and 15 show portions of a bounding process where a bounding row box or rectangle can be placed around each character (as shown in FIG. 14) and a row of characters (as shown in FIG. 15) and the bounded boxes can be used to determine the average object or character size.
Figure 15:
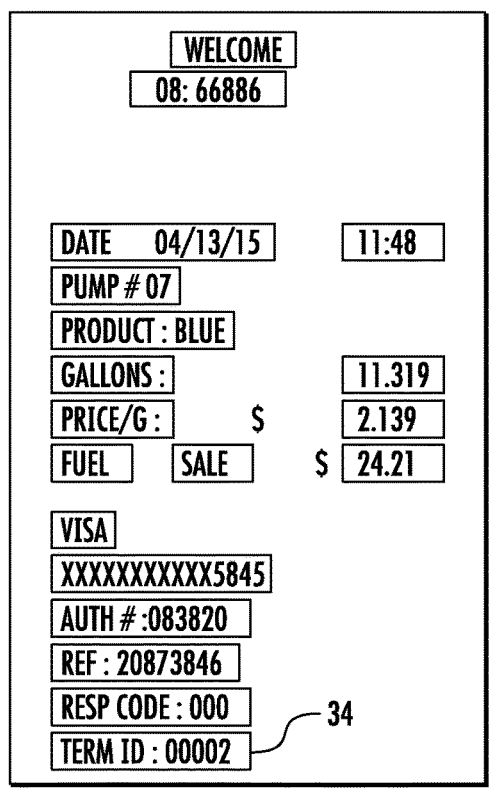

The bounding 34 process places a peripheral boundary around each character and around each row of characters 14. For example, a bounding row box or rectangle 34 can be placed around each character (as shown in FIG. 14) and a row of characters 14 (as shown in FIG. 15). The process uses the bounding row rectangle 34 to determine the average object or character size.

The bounding 34 process calculates and returns the minimal up-right bounding rectangle 34 for the specified point in an approximated contour for an object or character. The contour of the object is used to approximate a row of text objects. The height of the rows are then averaged to get an average character font height for the document. In exemplary pseudocode, the process submits variables for averaging the height and returning an average object size height:

```
long heightSum = 0
double fontScale = 0
for(int i=0; i < rects.size( ); i++)
{
        heightSum += rects[i].height;
}
if(rects.size( ) > 1 )
{
        fontScale = heightSum / rects.size( )
}.
```

Optionally, the bounding 34 process may include a filter that excludes objects of certain size parameters. For example, polygon objects with fewer than 2 or 3 components may be excluded. A more complex filter of objects outside a 2 to 19 font size is shown by the following pseudocode:

```
for(int i = 0; i < objects2.size( ); i++ )
{
  // When we move the camera far away,
  // the bounding rectangle can become 2 lines combined
      // filter these out
    if ( (objects2[i].Rect.width / 1.5 ) > objects2[i].Rect.height)
    {
            // Keep objects that are 2 pixels to 19 pixels in size
      if(objects2[i].Rect.height > 1 &&
                                  objects2[i].Rect.height < 20 )
      {
        rects.add(objects2[i].Rect);
      }
    }
}
``` wherein the filter blocks arrays of rectangles around objects wherein a width of the array is not at least 50% larger than the height. Also, the filter may exclude objects (characters) that have a size less than 2 pixels and greater than 19 pixels. Although other filter parameters are possible, the inventors have found that these parameters work well for images of financial documents such as receipts.

In another aspect of the present invention, as shown in FIGS. 1A and 1B, the source images 12 may be obtained 10 continuously, processed into nearsighted images (16, 18 and 20) further processed (30, 32 and 34) to determine average font height and used in a feedback loop 36 to facilitate repositioning the handheld electronic device 22. Generally, then, the process may use real-time feedback 66 on the size of the object in the source images 12 to determine and provide feedback or otherwise facilitate improved relative positioning of the handheld electronic device 22 and the foreground document 24 to improve OCR accuracy.

Figure 16:
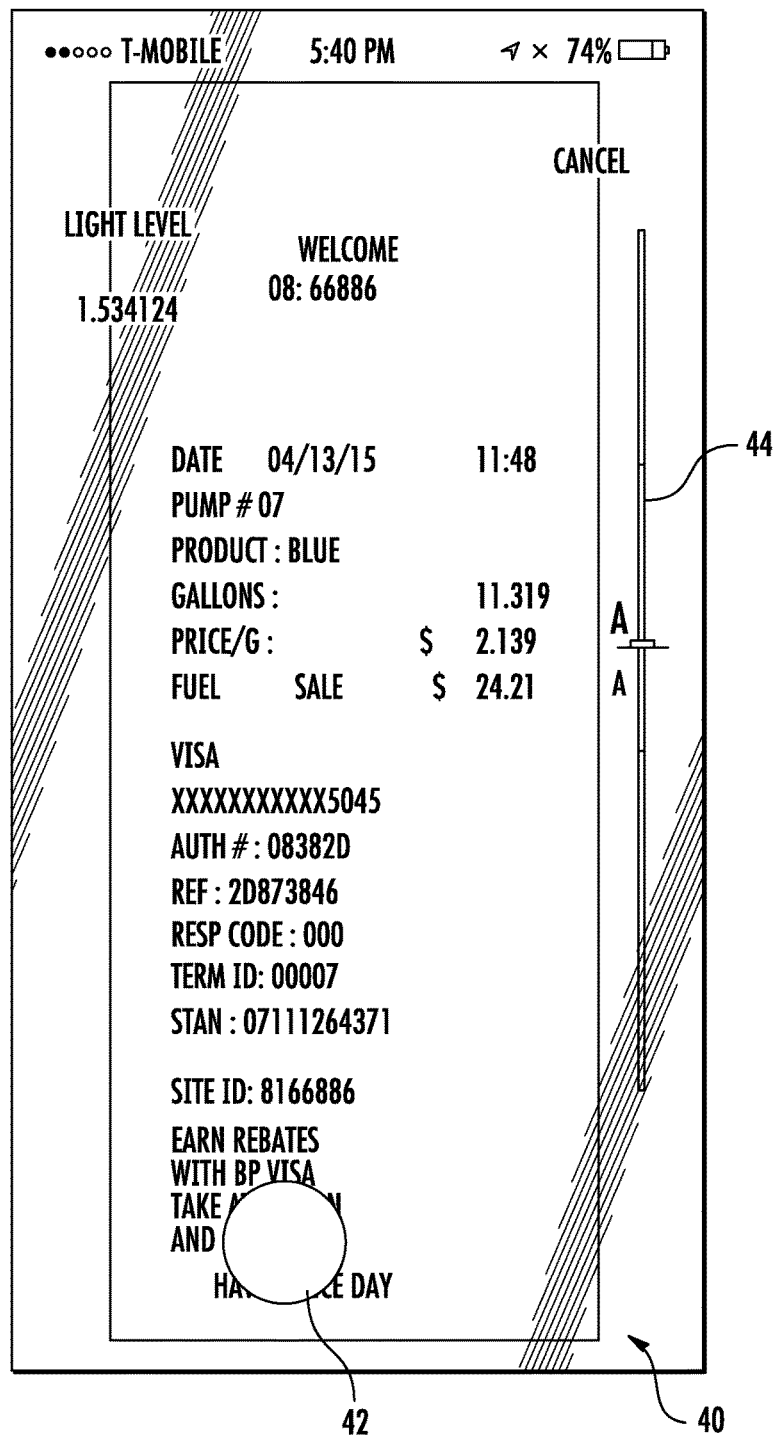
FIG. 16 shows a graphical display on the handheld electronic device.

FIG. 16 shows a graphical display 40 on the handheld electronic device 22. The graphical display 40 includes an image of a foreground document 24 that is currently being processed by a processor of the handheld electronic device 22 to be nearsighted in real-time. The graphical display 40 also includes a capture button 42 and a slider bar 44. The capture button 42 activates capture, storage and/or transmission of the image and/or the results of an OCR process on the image, preferably when the application communicates appropriate positioning of the device. Alternative or in addition, the application may have an automated feature where the image is automatically captured for further storage or processing when within the appropriate range of positions.

Figure 17:
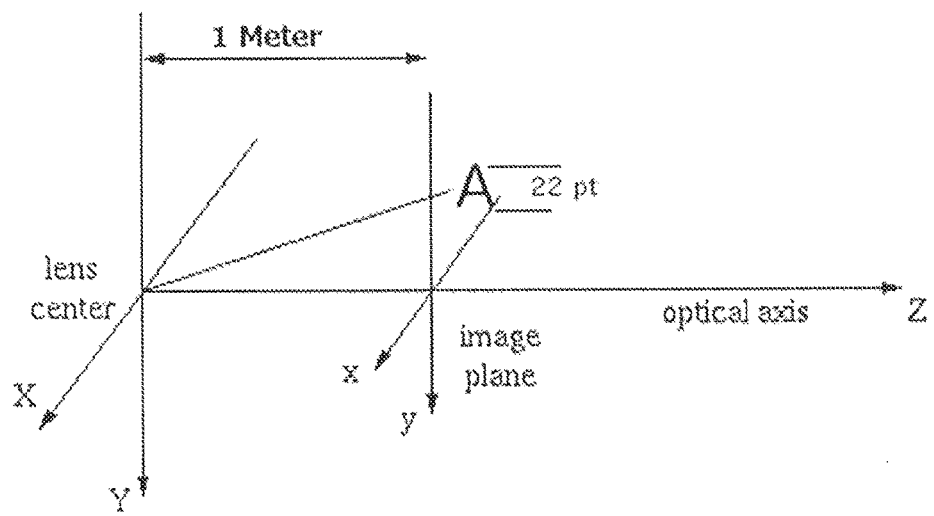
FIG. 17 shows a schematic of the relative (1 m along the optical axis) positioning of the lens of the camera with respect to the character "A" on the foreground document.

The slider bar 44 shows a range of relative positioning of the—within the center bar—that the slider may fall and still be within the preferred focal length of the camera. At a frame rate of 20 or 30 frames per second, the slider would readjust based on the current relative positioning. Moving too far out or in would cause the slider to move down or up outside the center bar and/or the center bar to flash a red color. When within the preferred range, the slider bar and center bar may turn green to signal that the image is ready for capturing and further processing. FIG. 17 shows a schematic of the relative (1 m along the optical axis) positioning of the lens of the camera with respect to the character "A" on the foreground document 24. The inventors have found that remarkably, the feedback system disclosed herein can improve positioning to within 1 inch (plus or minus) of the focal length of the lens.

The process of measuring the size of objects such as text fonts in real-time using a mobile electronic device (such as a video camera on a smart phone, tablet or some other moveable electronic or computing device with access to processing power) allows for a wide range of applications. Captured images have improved sizing and resolution for later comparisons in applications such as OCR or virtual reality marker detection. The advantages of this process are not limited to OCR. Any comparison based computer vision application will benefit when a known size object is presented before processing. The approach being presented here operates in real-time at 20~30 fps on a mobile device allowing for user feedback to get the optimal focal length and object size during image capture. This process is set apart from any other attempts by an accuracy of 1 inch or 25.4 mm while detecting nearsighted objects on a document or foreground.

Figure 19:
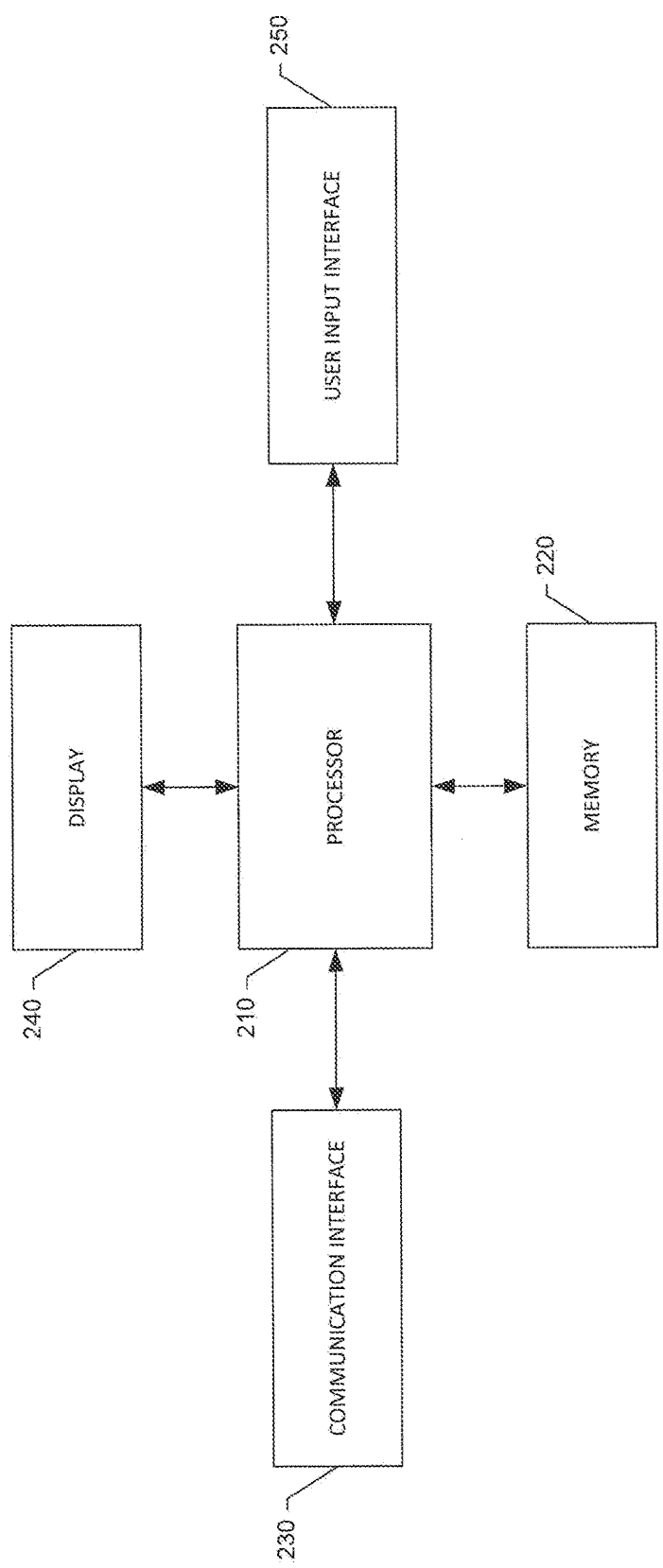
FIG. 19 is a schematic block diagram of an entity capable of performing the processes described herein.

Referring now to FIG. 19, an exemplary block diagram of an entity capable of operating as a handheld electronic device 22 is shown in accordance with one embodiment of the present invention. The entity capable of operating as a handheld electronic device 22 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as a handheld electronic device 22 can generally include means, such as a processor 210 for performing or controlling the various functions of the entity. In particular, the processor 210 may be configured to perform the processes discussed in more detail with regard to FIGS. 1A and 1B.

In one embodiment, the processor is in communication with or includes memory 220, such as volatile and/or non-volatile memory that stores content, data or the like. For example, the memory 220 may store content transmitted from, and/or received by, the entity. Also for example, the memory 220 may store software applications, instructions or the like for the processor to perform steps associated with operation of the entity in accordance with embodiments of the present invention. In particular, the memory 220 may store software applications, instructions or the like for the processor to perform the operations described above with regard to FIGS. 1A and 1B.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data such as a keypad, a touch display, a joystick, a camera or other input device.

Figure 20:
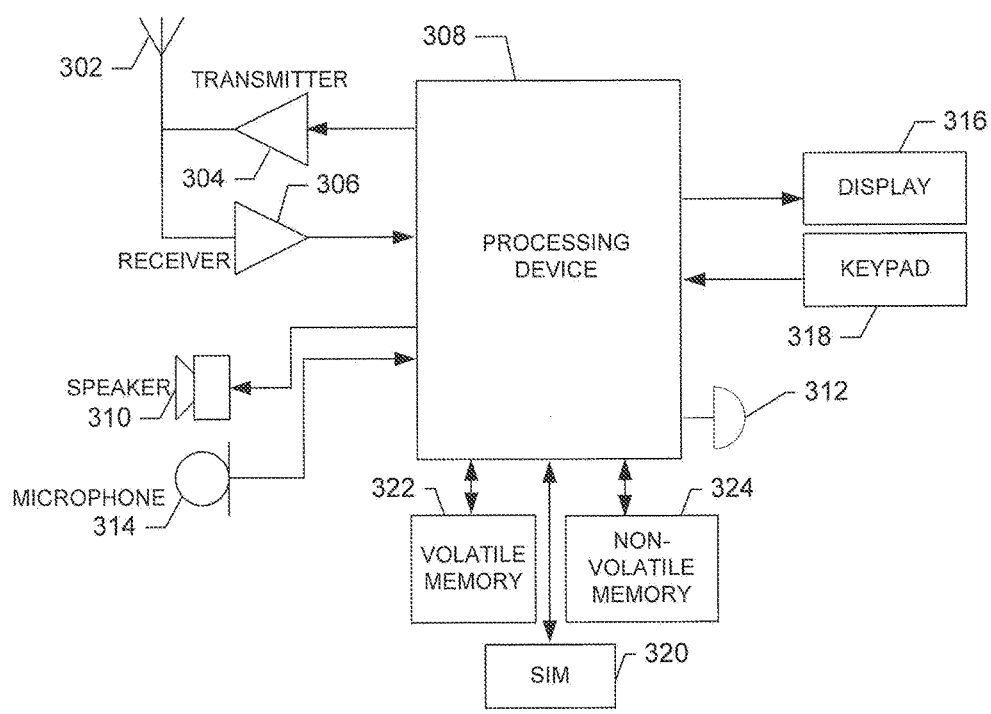
FIG. 20 is a schematic block diagram of an exemplary handheld electronic device mobile station capable of operating in accordance with an embodiment of the present invention.

Reference is now made to FIG. 20, which illustrates one type of electronic device that would benefit from embodiments of the present invention. As shown, the electronic device may be a handheld electronic device 22, and, in particular, a cellular telephone. It should be understood, however, that the device illustrated and hereinafter described is merely illustrative of one type of electronic device that would benefit from the present invention and, therefore, should not be taken to limit the scope of the present invention. While several embodiments of the handheld electronic device 22 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The handheld electronic device 22 includes various means for performing one or more functions in accordance with embodiments of the present invention, including those more particularly shown and described herein. It should be understood, however, that the mobile station may include alternative means for performing one or more like functions, without departing from the spirit and scope of the present invention. More particularly, for example, as shown in FIG. 20, in addition to an antenna 302, the handheld electronic device 22 includes a transmitter 304, a receiver 306, and an apparatus that includes means, such as a processor 308, controller or the like, that provides signals to and receives signals from the transmitter 304 and receiver 306, respectively, and that performs the various other functions described below including, for example, the functions relating to the processes described in relation to FIGS. 1A and 1B.

As one of ordinary skill in the art would recognize, the signals provided to and received from the transmitter 304 and receiver 306, respectively, may include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G, 3G, 4G, 4G LTE communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like It is understood that the processor 308, controller or other computing device, may include the circuitry required for implementing the video, audio, and logic functions of the mobile station and may be capable of executing application programs for implementing the functionality discussed herein. For example, the processor may be comprised of various means including a digital signal processor device, a microprocessor device, and various analog to digital converters, digital to analog converters, and other support circuits. The control and signal processing functions of the mobile device are allocated between these devices according to their respective capabilities. The processor 308 thus also includes the functionality to convolutionally encode and interleave message and data prior to modulation and transmission. Further, the processor 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 310, a ringer 312, a microphone 314, a display 316, all of which are coupled to the processor 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which may store information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for performing the processes associated with FIGS. 1A and 1B, as described herein.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Implementations of the present invention provide many advantages. Measurement of the distance of the lens from the paper facilitates capture of a font object size for improved clarity. The improved clarity results in improved OCR recognition rates as compared to freehand capture of the image. Implementations also provide an ability to calculate optimal font size for OCR detection on a live video feed while accounting for optimal focus and clarity. Implementations of the present invention can measure and record optimal focal length and OCR font size ranges on raw video feed. These measurements can be used to guide the camera user through visual cues and indicators to move the camera to the best location in space. This produces a better OCR compatible image for text recognition. The focal ratio determines how much light is picked up by the CCD chip in a given amount of time. The number of pixels in the CCD chip will determine the size of a font text character matrix. More pixels means a bigger font size, regardless of the physical size of the pixels. OCR engines have an expected and optimal size range for character comparison. When fonts are in the optimal range and have clear crisp well defined edges, OCR detection and accuracy is improved. Implementations of the present invention provide guidance to that optimal range.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

That which is claimed:

1. A method of generating, during acquisition via a camera of a foreground document, a plurality of pre-processed images of the foreground document, the pre-processed images being used to optimize a capture position of the camera when capturing the foreground document for optical character recognition, the method comprising:
    obtaining a plurality of source images, including a first source image and a second source image, continuously acquired via the camera of a computing device, each of the obtained plurality of source images containing characters associated with the foreground document, wherein the first source image is acquired by the camera at a first capture position, and wherein the second source image is acquired by the camera at a second capture position, wherein the first capture position is different from the second capture position;
    for each of the plurality of obtained source images, pre-processing a given obtained source image to generate, by a processor of the computing device, a pre-processed image of the given obtained source image so as to emphasize the characters associated with the foreground document and to attenuate image background objects that are background to the characters associated with the foreground document by i) detecting edges of the characters in the given obtained source image using an image processing operation, ii) thickening edges of the characters of the detected edge characters to generate a first intermediate image data using a second image processing operation, and iii) thresholding the first intermediate image data; and
    presenting, on a graphical user interface, via a display of the computing device, i) the pre-processed image and ii) a graphical indicator to guide physical repositioning of the camera to capture an image to be used by an optical character recognition operation to determine characters of the foreground document, wherein the graphical widget presents one or more parameters associated with repositioning of the camera relative to the foreground document, wherein the one or more parameters are determined based on the characters associated with the foreground document in the pre-processed image.

2. The method of claim 1, wherein the operation of detecting edges of the characters includes estimating a gradient of characters in the source image.

3. The method of claim 2, wherein the operation of thickening edges of the characters includes determining an absolute gradient magnitude at points within the source image.

4. The method of claim 3, wherein the operation of detecting and thickening the edges include using at least a 3×3 mask.

5. The method of claim 4, wherein the mask is smaller than an average size of the characters.

6. The method of claim 4, wherein the mask is a convolution mask.

7. The method of claim 2, wherein the operation of estimating the gradient of the characters includes estimating the gradient of the characters in a first direction.

8. The method of claim 7, wherein the operation of estimating the gradient of the characters includes further estimating the gradient of the characters in a second direction.

9. The method of claim 8, wherein the first direction is an x-direction and the second direction is a y-direction.

10. The method of claim 1, wherein the operation of detecting and thickening edges of the characters include using a Sobel operator.

11. The method of claim 10, wherein the Sobel operator uses at least one convolution mask.

12. The method of claim 11, wherein the Sobel operator uses a pair of convolution masks.

13. The method of claim 12, wherein the convolution masks are smaller than the characters.

14. The method of claim 13, wherein the convolution masks are 3×3 pixels.

15. The method of claim 10, wherein the operation of using the Sobel operator includes sliding the convolution mask over the source image.

16. The method of claim 1, wherein the operation of thickening edges includes calculating a magnitude of a gradient of the detected edges of the characters.

17. The method of claim 16, wherein the operation of thickening edges includes estimating the gradient of the detected edges using a mask.

18. The method of claim 1, wherein the operation of thresholding includes using an assumption of a foreground and background in the source image.

19. The method of claim 18, wherein the operation of thresholding includes determining an optimal threshold value.

20. The method of claim 19, wherein the operation of determining the optimal threshold value includes minimizing within class variance of the foreground and background.

21. The method of claim 20, wherein the operation of minimizing within class variance includes weighting the foreground and background.

22. The method of claim 1, wherein the operation of thresholding includes removing grayscale from a background of the source image.

23. The method of claim 22, wherein the operation of thresholding includes using histogram segmentation.

24. The method of claim 23, wherein the operation of thresholding includes using Otsu global thresholding.

25. The method of claim 23, wherein the operation of thresholding includes using a block size smaller than an average size of the characters.

26. The method of claim 1, wherein the operation of thresholding is repeated until a nearsighted image is generated.

27. The method of claim 1, further comprising morphologically closing characters after thresholding in an image processing operation prior to the pre-processed image or the given obtained source image being captured and being stored.

28. The method of claim 27, wherein the operation of morphologically closing includes using a structuring element.

29. The method of claim 28, wherein the structuring element includes a line-shaped structuring element to fill gaps in the characters.

30. The method of claim 1, further comprising determining a contour of the characters in an image processing operation prior to the pre-processed image or the given obtained source image being captured and being stored.

31. The method of claim 30, wherein the operation of determining the contour includes determining contour points.

32. The method of claim 31, wherein the operation of determining the contour includes determining a contour hierarchy.

33. The method of claim 32, comprising:
automatically capturing and storing the pre-processed image when the foreground document is within a range of positions, the range being determined based on the characters associated with the foreground document in the pre-processed image.

34. The method of claim 32, wherein the operation of determining the contour includes using hierarchical border following.

35. The method of claim 31, further comprising dropping contours with less than three contour points.

36. The method of claim 31, further comprising approximating the contour points as polygonal curves.

37. The method of claim 30, wherein the operation of approximating the contour points includes reducing the contour to a simple closed polygon.

38. The method of claim 30, further comprising bounding the contour.

39. The method of claim 38, wherein the operation of bounding includes circumscribing the contour with a rectangle.

40. The method of claim 39, wherein the operation of circumscribing includes determining minimal upright bounding rectangle for the contour.

41. The method of claim 40, further comprising using a plurality of contours to approximate rows of characters.

42. The method of claim 41, further comprising determining an average height of the rows of characters.

43. The method of claim 42, further comprising determining an average font height for the characters based on the average height of the rows of characters.

44. The method of claim 43, further comprising performing optical character recognition using the average font height.

45. The method of claim 1, comprising:
storing, the second intermediate image data; and
transmitting the pre-processed image to a second computing device to be used by the second computing device to determine characters of the foreground document in the second intermediate image data.

46. The method of claim 45, wherein the computing device comprises a handheld electronic device.

47. The method of claim 46, wherein the plurality of source images are captured as a video feed by the camera of the computing device.

* * * * *